May 28, 1935.　　　M. I. DORFAN　　　2,003,141
APPARATUS FOR SEPARATING GRANULAR MATERIAL
Filed Dec. 14, 1932　　2 Sheets-Sheet 1
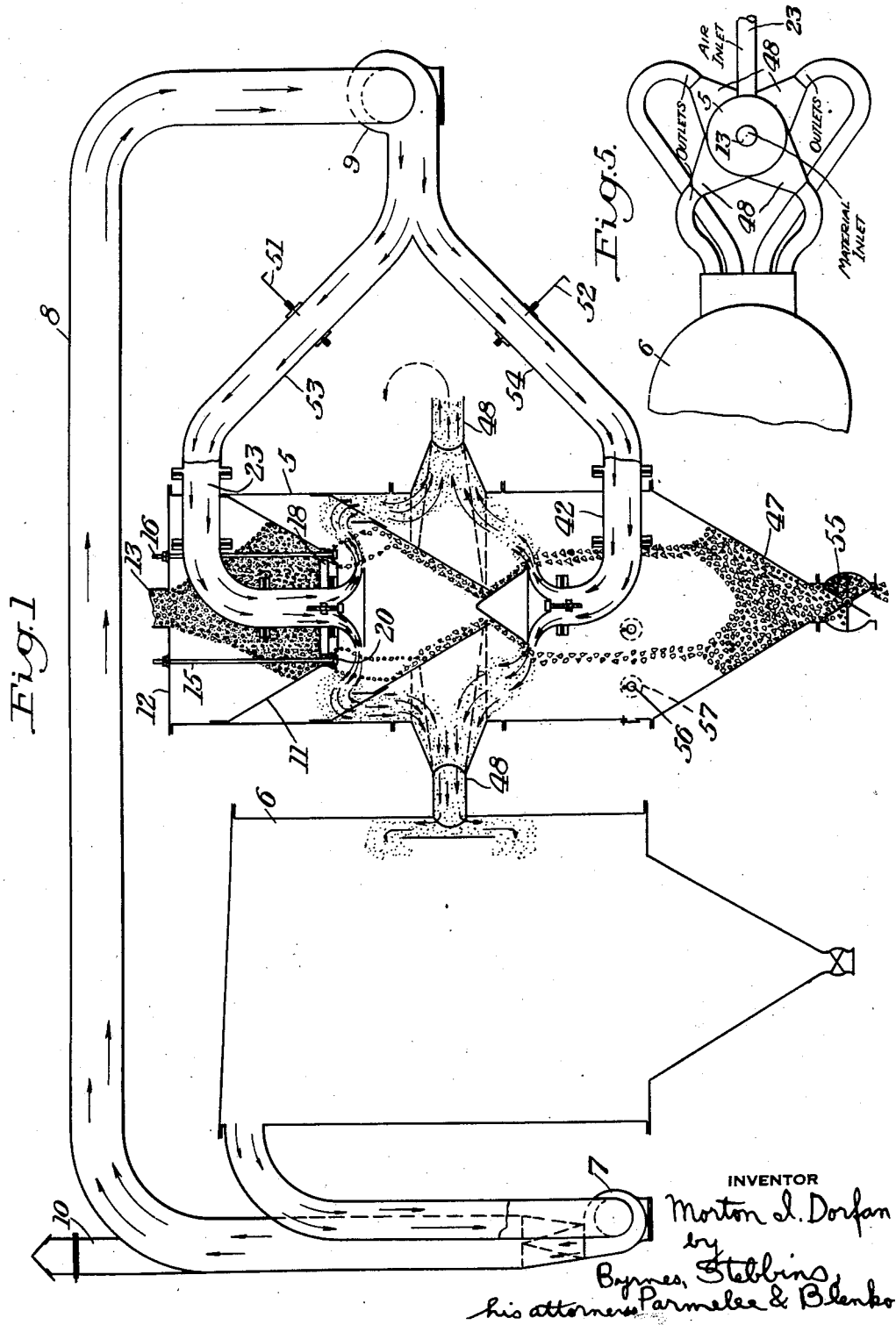
INVENTOR
Morton I. Dorfan
by Byrnes, Stebbins,
Parmelee & Blenko
his attorneys May 28, 1935. M. I. DORFAN 2,003,141
APPARATUS FOR SEPARATING GRANULAR MATERIAL
Filed Dec. 14, 1932 2 Sheets-Sheet 2
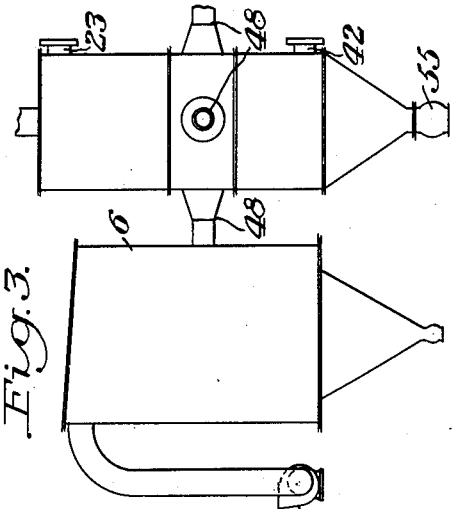
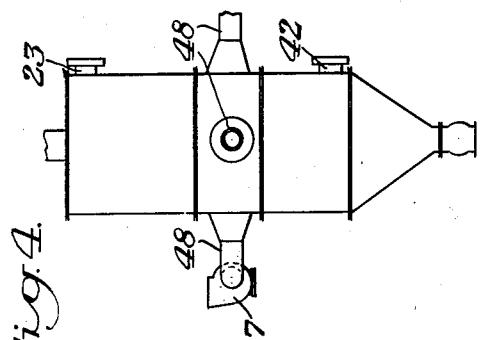
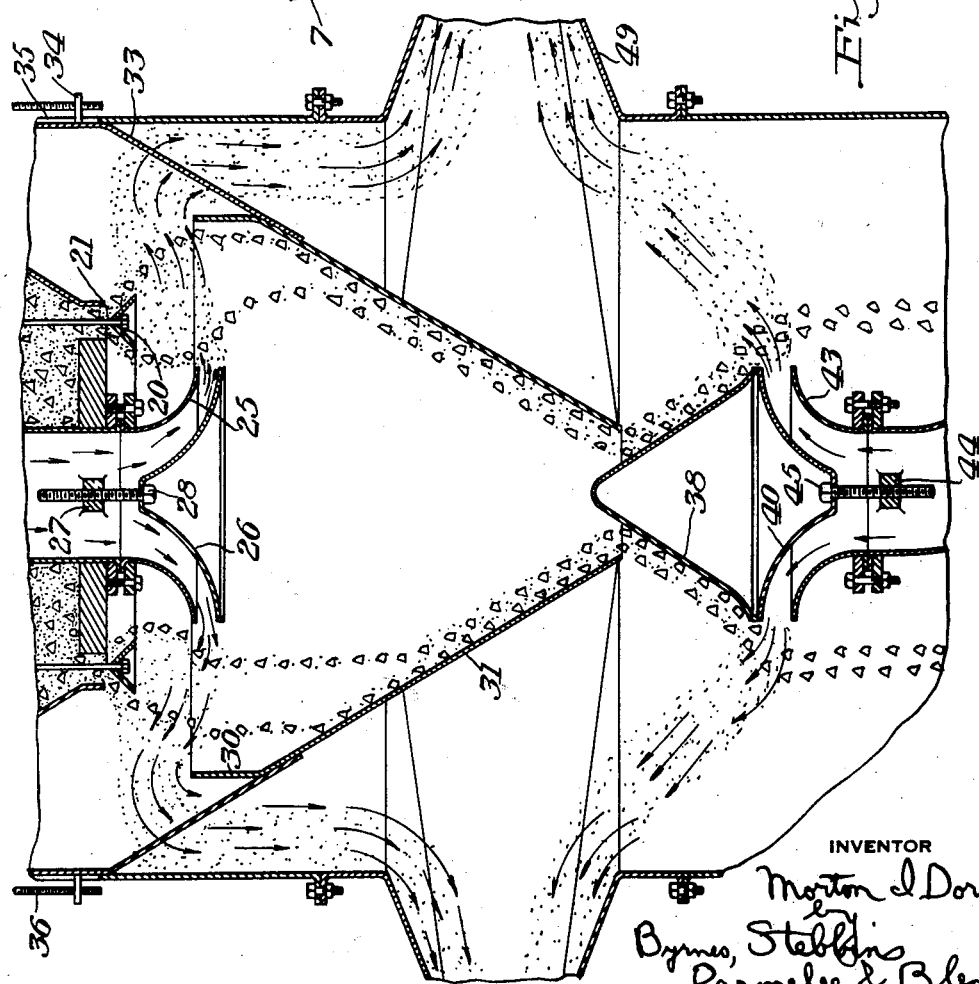
INVENTOR
Morton I Dorfan
By Byrnes, Stebbins,
Parmelee & Blenko
his attorneys Patented May 28, 1935

2,003,141

UNITED STATES PATENT OFFICE 2,003,141

APPARATUS FOR SEPARATING GRANULAR MATERIAL

Morton I. Dorfan, Pittsburgh, Pa., assignor to Blaw-Knox Company, Blawnox, Pa., a corporation of New Jersey Application December 14, 1932, Serial No. 647,085

3 Claims. (Cl. 209—150)

This invention relates to a method and apparatus for separating coarse particles or granules from fine particles or dust. As a specific application of the invention, dust or the like may be separated from coarse granular material to cleanse the latter.

In accordance with my invention, the well known principle of floating the finer particles away from the coarser particles by means of a current of air is made use of. While this principle has been employed in the winnowing of chaff from grain from time immemorial, such a procedure in its simple form does not take care of more exacting conditions which are frequently met with in separating coarse particles from finer particles or dust. Thus, the material may, due to a slight moisture content or to some other characteristic of the material, fail to respond to the ordinary procedure of the winnowing type as usually employed. Too strong a current of air will carry substantially all of the material with it, and thus deplete the quantity of material collected after the completion of the process. Moreover, there is not sufficient possibility of regulation of the coarseness of the particles which are retained and collected; or from the opposite point of view, it is not possible to regulate the degree of fineness up to and including which the particles are caught up by the current of air and separated from the coarser particles.

I have, in accordance with my invention, provided a way of separating coarse particles or granules from fine particles or dust which provides a close control of the separation effected; and more particularly, I provide a relatively high velocity of air, in fact a higher velocity than that sufficient to carry away in suspension the dust particles or the like which are to be removed from the larger particles or granules of the material. In particular, this air moving at relatively high velocity has a scrubbing action for scrubbing fine particles from the coarser particles to which they may adhere due to moisture or other condition giving rise to adhesion between the same. In order to insure as far as possible that the coarse particles shall not be contaminated by the fine particles or dust, I carry out the separation in a plurality of stages and thereby obtain the very advantageous result of at least drying the material in a preliminary stage or stages; so that as the particles grind against each other, the fine particles or dust are dislodged and may be carried or floated away by the current of air in a subsequent stage of the separation.

In the accompanying drawings in which, not as limiting my invention, I have shown certain illustrative embodiments which my invention may assume, Fig. 1 is a diagrammatic view in elevation showing one form which the invention may assume, Fig. 2 is a detail view of the portion of the apparatus shown in Fig. 1 which relates to the floating away or separation of the finer particles from the coarser particles, Fig. 3 is a diagram depicting a modification of the first form of my invention, Fig. 4 is a still further modified form of my invention; and Fig. 5 is a diagrammatic plan view of Fig. 2.

Referring to the form of my invention shown in Fig. 1, it will be noted that the separation of the fine particles from the coarse particles is in general accomplished in a container 5, the air in which the fine particles are carried or floated off being conducted to a dust collector 6. The cleaned air is pumped by a fan 7 into a conduit 8. If necessary, a second fan 9 or booster is connected in series with the fan 7. The air is discharged through one or more nozzles so that the air passes outwardly from within the hollow stream of freely falling material. In case the suction created by the fans causes leakage into the system, the surplus may be returned to the atmosphere by a vent 10.

The material is supplied to a hopper having as a portion of its bounding walls the container 5. The bottom of the hopper is constituted by an inverted conical member 11 which may be secured in suitable fashion to the walls of the container 5. In the embodiment shown in Fig. 1, the top of the hopper is enclosed by means of a cover 12 having a restricted inlet 13; although for certain installations, it may be advisable to omit the cover 12.

A valve is hung within the hopper so as to control the discharge of material from the same. This valve may be hung in any suitable manner from supports provided therefor; and in the embodiment shown in Fig. 1 is hung from the cover 12 by rods or elongated bolts 15. The nuts 16 may be turned to raise and lower the valve so as to restrict or increase the opening for discharge of the material from the hopper.

The valve 20 is movable toward and from an annular discharge opening between the conical member 11 and an annulus 18 supported in suitable fashion (not shown) in fixed relation to an air inlet, later to be described. The valve 20 also constitutes a dividing means, and for this purpose may take the form of an annular angle iron providing two downwardly sloping side portions. The upper rim 21 of the dividing means is a separating edge so that as the material is discharged from the hopper, it falls in two hollow coaxial streams.

Air for carrying out the separation of the material into coarse and fine particles flows into the container 5 by way of a pipe 23. This pipe 23 is bent downwardly so as to pass down through the material within the hopper and extend through the annulus 18. The bottom end of the pipe 23 is flared as shown at 25; and a bell-shaped valve 26 is hung within the trumpet shaped end of the pipe. A cross bracket 27 within the pipe 23 is provided with a threaded bore to receive a bolt 28 by which the valve 26 is supported and adjusted. It will be apparent, therefore, that as valve 26 fixed to the bolt 28 is rotated so as to move the valve 26 upwardly or downwardly, the velocity of the air discharged through the annular discharge opening between the valve 26 and the flared end 25 of the pipe may be increased or decreased.

The valve controlling the flow of air is slightly below and substantially coaxial with the valve 20 controlling the downward discharge of material. The annular opening permits the uniform discharge of air outwardly so as to pass through the hollow streams of material from within. The finer particles or dust are carried or floated away by the air if there is not too great cohesion between the fine and coarse particles. It should be noted at this point, however, that even though the current of air discharged in this fashion is not sufficient to scrub from the larger or coarser particles all of the finer particles or dust, the air at least has a drying action.

The air as discharged from the annular opening impinges upon the particles of material before the air has lost its velocity to any substantial extent. In spreading out, however, the air loses velocity. Moreover, the air is given a slight upward trend by a baffle 30 which surrounds the annular discharge opening for the air. Thus, any large particles which may be given radial movement due to the high velocity of the air, strike against the baffle 30; while the smaller particles or dust are carried bodily or floated by the air up over the baffle 30.

This baffle 30 may, as shown in Figs. 1 and 2, constitute the upper rim of a lower hopper. The bottom 31 of the lower hopper takes the shape of an inverted cone in similar fashion as does the bottom of the upper hopper. The lower hopper is adjustably supported by a plurality of brackets 33 secured as by spot welding or by bolts to the inverted cone 31. Each of these brackets 33 is provided with a lug 34 which projects through a slot 35 in the wall of the container 5. A screw 36 supported in an obvious manner (not shown) from the container 5 or any other suitable support is threaded through each lug 34. By proper adjustment of the screws 36, the lower hopper may be raised or lowered relative to the container 5.

The lower end of the inverted cone 31 is open; and beneath this opening is disposed a conical valve 38 functioning partly as a needle valve and partly as a spillway for discharging the material from the lower hopper in a hollow or cylindrical stream. It should be noted at this point that the valve opening may be controlled by adjustment of the inverted cone 31 upwardly or downwardly.

The material discharged from the upper hopper has passed through one separation or grading stage, the air passing over the baffle 30 carrying with it to a greater or less extent the fine particles or dust mixed with the coarse particles of the material. The portion of the material which is not carried over the baffle 30 tumbles down the inverted cone 31; and inasmuch as a drying action results from the treatment with air as above described, the fine particles or dust do not have the adherence due to moisture; and therefore, in tumbling along the walls of the inverted cone 31, the particles of the material grind against each other so as to tend to dislodge the fine particles or dust.

Beneath the valve 38 is disposed an air valve 40. The valves 38 and 40 may be made in one piece or may be made in two pieces, as shown in Fig. 2, and secured together as by welding. Air enters the lower part of the container 5 by way of a pipe 42 which bends upwardly, terminating in a flared or trumpet shaped end 43. A cross piece 44 is provided with a threaded bore for receiving a bolt 45 which carries the valve 40, and accordingly the valve 38. Adjustment of these valves with relation to the trumpet end 43 of the pipe 42 may be accomplished in similar fashion to that explained in connection with the valve 26.

The material discharged from the lower hopper falls over the conical surface of the valve 38 and drops from the rim of the same in a hollow stream through which the air flowing along the pipe 42 passes, carrying with it the fine particles or dust which have been dislodged from the larger particles during the travel of the material downwardly within the container 5. The air scrubs the coarse particles due to its high velocity, since the hollow stream of material passes closely adjacent the annular discharge opening from the pipe 42. The heavier particles may be thrown outwardly with sufficient velocity to strike against the walls of the container 5, but they then drop downward to the hopper 47 which forms the bottom of the container 5. The outlets 48 (of which there may be such number as to give the proper velocity to the air used for cleaning) are lower than the baffle 30 but higher than the annular discharge opening between the valve 40 and the trumpet end 43 of the pipe 42. The air discharged from this latter opening must, therefore, rise in passing outwardly from the container 5; and, therefore, only those particles which at the discharge velocity of the air will be carried along or suspended thereby remain in the stream of air. The lower walls 49 of the outlets 48 are sloped downwardly so as to return to the container 5 any heavy particles which may drop out of the air stream. Inasmuch as the air increases in velocity slightly due to converging into the outlets 48, there is not so great a tendency for the deposit of particles at a part remote from the walls of the container 5.

The distribution of air to the two jets may be regulated by means of dampers 51 and 52 disposed in the two branches 53 and 54 respectively which lead to the pipes 23 and 42. If the material is very dry, it may be unnecessary to utilize the upper air jet, the mere separation of the material into streams by the dividing means 20 as the material flows out of the upper hopper and down the inclined walls of the lower hopper being sufficient to grind off any dust that adheres to the particles. Accordingly, the lower air jet will suffice to clean the material of dust or separate the material into fine and coarse material.

It is evident that the fineness of the material carried over into the outlets by the air issuing from either the upper or lower jet will be determined in large measure by the velocity of the air in the respective jet and the quantity of air passing through each jet. The velocity of the air passing through the jets may be controlled by adjustment of the respective valves; while the quantity of air passing through the jets may be controlled by the respective dampers 51 and 52. By these two adjustments, it is possible to obtain the removal of particles of the desired fineness with a capability of considerable variation in the grade of fineness removed.

In other words, the demarcation in size between the particles which are allowed to settle and the particles which are caused to rise is a function of the upward velocity of the air. This upward velocity of the air is regulated by the amount of air introduced at the nozzle and the extent to which the original high velocity is reduced, due to the size of the container, before the air is exhausted from the container. In the particular construction shown, there is the further possibility of regulating the size of particle carried away by the air by adjusting the amount of air in the lower blast as compared with the amount of air in the upper blast. A supplemental adjustment is to some extent made possible by a regulation of the speed of the fans themselves.

Such particles as drop onto the lower walls 49 tumble down the same and into the hopper 47. From this hopper 47 the material may be discharged or drawn off. For purposes of illustration, a rotary valve 55 is illustrated in Fig. 1 as controlling the discharge from the hopper 47.

The air passing outwardly through the outlets 48 is passed to a dust collector 6. The construction and characteristics of the dust collector 6 may be selected so as to meet the demands of the particular conditions encountered. Such collectors are well known, and no detailed description of the same is believed necessary, the particular collector to be used being selected according to the requirements.

From the dust collector 6 the air may be discharged as above described in connection with Fig. 1. In certain localities, or in connection with certain dust collectors of high efficiency, the air may be discharged into the atmosphere in the manner illustrated in Fig. 3. Again, there is a possibility that no harm will be done by discharging the cleaning air directly into the atmosphere as shown in Fig. 4, the collector 6 being omitted in such case.

The air velocity will be so high at the discharge outlets as to do more than merely float away the dust. So high a velocity is in certain instances employed that the particles are subjected to a scrubbing action. No harm results, as loss of material is prevented by the slowing down of the velocity of the air, so as to leave behind in the container the particles which cannot be carried or floated away by the current of air. Moreover, the baffle 30 which may be arranged either vertically or inclined inwardly at a slight angle, causes the heavier particles to bounce back to be retained in the inverted cone 31.

In the drawings, granular material has been shown as flowing through the apparatus as if the velocity of air past those orifices was quite low. If, on the other hand, the velocity of the air were kept high and the particles being cleaned were comparatively small, the air might impart sufficient velocity to the particles as they dropped past the annular opening of the jet so that they would be blown violently against the baffle 30 or against the side of the container 5. Under these conditions, the granular material will not only be subjected to the scouring action of the air and to the impact of one grain against another, but also to the shock of impact of the grains against the container, which impact also tends to dislodge the dust and render cleaning more perfect. In order to carry away the dislodged dust, openings may be provided in the walls of the container 5 just above the hopper 47, these openings 56 being controlled by adjustable covers 57.

The preceding description has been applied to granular material generally; and it will be understood that the term "granular material" is a term of description and not of limitation, being inclusive of sand, grain, powdered coal, or in fact any material in which the particles are of various sizes, and not permanently adhering together.

The baffle 30 and the lining of the container 5 may be made renewable or of suitable hard material or abrasion resisting material. Rubber is an example of such material.

Certain of the advantages inherent in the method and apparatus above described have been set forth in the course of the description. As the apparatus and method are applicable both to the separation of material into different grades of fineness, and to the cleansing of coarse granular material from fine particles or dust, or vice versa, the flexibility of the apparatus in its application to a variety of degrees of fineness of the particles separated out is of importance.

Another advantage resides in the method of feeding the granular material over the dividing means so as to obtain a plurality of thin streams of material through which the air may blow, and thus effectively separate the dust without having to carry it through too great a thickness of granular material. A further advantage arises out of the exposure of every particle of the material to the air as the material passes the annular orifice of the air jet. The use of air blasting in a plurality of stages is of advantage in that the material is dried to a considerable extent in the first stage so that even though a large portion of the dust be not removed in this first stage, the material is prepared for separation or cleansing in a later stage.

The exposure of every particle of the material, to the air issuing from the air jet is provided for to a remarkable extent by the apparatus disclosed herein. The extent to which very minor details disturb the even flow of air due to its light specific gravity is well known. With prior constructions it has been almost impossible to get uniformity of air flow. With the annular opening provided for supplying the separating or cleaning air, the uniform distribution of air flow in every direction makes possible a most unusual uniformity in the grading or separating of the material being worked upon. This uniform distribution of air flow radially in every direction is assisted and promoted by the even spacing about the axis of the container 5 of the outlets 48.

The apparatus has the further advantage of being compact since the separation is accomplished in a minimum of height. The apparatus has the further advantage that there are no moving parts, the air blast itself accomplishing the separation or cleansing.

While I have described several embodiments of the apparatus and certain preferred modes of procedure in performing the operation of cleansing granular material of dust or separating granular material into finer and coarser portions, it will be understood that the invention is not restricted to the particular embodiments of the apparatus shown nor to the specific steps of the method set forth herein, but may be variously modified within the contemplation of the invention and under the scope of the following claims.

I claim:

1. Apparatus for cleaning granular material comprising means for pouring the material, said pouring means having a substantially annular discharge opening, annular deflecting means below said discharge opening for dividing the poured material into inner and outer hollow streams, and means for blowing air transversely of the freely falling material.

2. Apparatus for classifying finely divided material comprising means for pouring hollow streams of the material, said pouring means having a substantially annular discharge opening and an adjustable closure for regulating the rate of discharge of material from said pouring means and dividing the material into inner and outer streams, and means for blowing air outwardly through the hollow streams of material from within.

3. Apparatus for classifying finely divided material comprising means for pouring a hollow stream of the material, an adjustable closure for said pouring means for dividing the poured material into inner and outer hollow streams and for regulating the rate of discharge of material from said pouring means, and means for blowing air outwardly through the hollow stream from within, said means including a discharge nozzle beneath said pouring means, said discharge nozzle being adjustable to regulate the volume of air discharged through said nozzle.

MORTON I. DORFAN.